US011002707B2

(12) United States Patent
Enamito et al.

(10) Patent No.: US 11,002,707 B2
(45) Date of Patent: May 11, 2021

(54) HAMMERING SOUND DIAGNOSTIC DEVICE AND METHOD USABLE WITH A ROBOT

(71) Applicants: Kabushiki Kaisha Toshiba, Minato-ku (JP); Toshiba Energy Systems & Solutions Corporation, Kawasaki (JP)

(72) Inventors: Akihiko Enamito, Kawasaki (JP); Osamu Nishimura, Kawasaki (JP)

(73) Assignees: Kabushiki Kaisha Toshiba, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 260 days.

(21) Appl. No.: 16/108,626

(22) Filed: Aug. 22, 2018

(65) Prior Publication Data
US 2019/0285588 A1 Sep. 19, 2019

(30) Foreign Application Priority Data

Mar. 14, 2018 (JP) .............................. JP2018-046871

(51) Int. Cl.
*G01N 29/04* (2006.01)
*G01N 29/12* (2006.01)
*G01N 29/44* (2006.01)

(52) U.S. Cl.
CPC .......... *G01N 29/045* (2013.01); *G01N 29/12* (2013.01); *G01N 29/4427* (2013.01);
(Continued)

(58) Field of Classification Search
CPC ................. G01N 29/045; G01N 29/12; G01N 2291/023; G01N 2203/0039; G01M 7/08;
(Continued)

(56) References Cited

U.S. PATENT DOCUMENTS 4,889,000 A * 12/1989 Jaafar .................... G01R 31/34
73/865.8
4,901,572 A * 2/1990 Suyama ................. G01R 31/34
73/572
(Continued)

FOREIGN PATENT DOCUMENTS

JP 2-241340 9/1990
JP 05-169529 7/1993
(Continued)

OTHER PUBLICATIONS

Markman et al, Generator In-Situ Inspections A Critical Part of Generator Maintenance Cost Reduction GER-3954C, GE Energy (Year: 2012).*

(Continued)

*Primary Examiner* — David L Singer
(74) *Attorney, Agent, or Firm* — Oblon, McClelland, Maier & Neustadt, L.L.P.

(57) ABSTRACT

Diagnostic device including a hammering sound signal acquisition unit, a frequency characteristic conversion unit, and an abnormality determination unit. The hammering sound signal acquisition unit acquires an i-th hammering sound signal and a j-th hammering sound signal representing hammering sounds with respect to striking applied to an i-th and a j-th struck position of an inspection target. The frequency characteristic conversion unit respectively converts the i-th hammering sound signal and the j-th hammering sound signal into an i-th frequency characteristic and a j-th frequency characteristic. The abnormality determination unit determines presence or absence of an abnormality in the inspection target on the basis of a matching degree of waveforms around peaks in the i-th frequency characteristic and waveforms around peaks in the j-th frequency charac-
(Continued)

teristic. The diagnostic device can be used with an inspection robot to automatically analyze for loose stator wedges.

11 Claims, 7 Drawing Sheets

(52) U.S. Cl.
CPC .. *G01N 2291/014* (2013.01); *G01N 2291/023* (2013.01); *G01N 2291/0258* (2013.01); *G01N 2291/2693* (2013.01)

(58) Field of Classification Search
CPC ........ G01M 7/00; G01M 13/028; G01H 1/06; G01H 1/14
See application file for complete search history.

(56) References Cited

U.S. PATENT DOCUMENTS

| | | | | |
|---|---|---|---|---|
| 4,962,660 A * | 10/1990 | Dailey | ............... | G01N 3/30 73/12.09 |
| 4,970,890 A * | 11/1990 | Jaafar | ............... | G01R 31/34 73/12.09 |
| 5,020,234 A * | 6/1991 | Alkire | ............... | G01B 7/14 33/656 |
| 5,105,658 A * | 4/1992 | Jaafar | ............... | G01R 31/34 73/865.8 |
| 5,216,921 A * | 6/1993 | Tsuboi | ............... | G01N 29/12 702/39 |
| 5,295,388 A * | 3/1994 | Fischer | ............... | G01M 7/08 73/12.09 |
| 5,309,765 A * | 5/1994 | Horigome | ............ | G01N 29/11 73/602 |
| 6,026,686 A * | 2/2000 | Hattori | ............... | G01N 29/045 702/56 |
| 8,446,287 B2 * | 5/2013 | Morisawa | ............... | G01H 1/00 340/683 |
| 2002/0198669 A1 * | 12/2002 | Lusted | ............... | G01M 7/00 702/56 |
| 2005/0021251 A1 | 1/2005 | Mueller et al. | | |
| 2007/0034009 A1 * | 2/2007 | Pado | ............... | G01N 29/42 73/579 |
| 2008/0059119 A1 * | 3/2008 | Hashimoto | ............ | G01H 3/08 702/183 |
| 2009/0243419 A1 * | 10/2009 | Humphries | ............ | G01M 7/00 310/196 |
| 2011/0215750 A1 * | 9/2011 | Andersen | ............... | H02K 11/20 318/460 |
| 2014/0020470 A1 * | 1/2014 | Tsutsui | ............... | G01N 29/045 73/645 |
| 2017/0138906 A1 * | 5/2017 | Hartwig | ............... | G01N 29/12 |
| 2017/0343516 A1 | 11/2017 | Matsunaga et al. | | |
| 2019/0017973 A1 | 1/2019 | Enamito et al. | | |
| 2019/0368968 A1 * | 12/2019 | Morimoto | ............ | G01N 29/045 |

FOREIGN PATENT DOCUMENTS

| | | | |
|---|---|---|---|
| JP | 2000131196 A | * | 5/2000 |
| JP | 2002-323371 | | 11/2002 |
| JP | 2003-185542 | | 7/2003 |
| JP | 2006-250660 | | 9/2006 |
| JP | 2007-18164 | | 1/2007 |
| JP | 2010-117318 | | 5/2010 |
| JP | 2011-21974 | | 2/2011 |
| JP | 2019-20144 A | | 2/2019 |
| WO | WO 2016/092869 A1 | | 6/2016 |

OTHER PUBLICATIONS

Peng et al, A New Method for Stator Slot Wedge Testing of Large Generators, IEEE Transactions on Dielectrics and Electrical Insulation vol. 15, No. 4; Aug. 2008 (Year: 2008).*
Iris Power, Iris Power Stator Wedge Analyzer (SWA) Instrument to Identify Loose Stator Winding Wedges, QUALITROL (Year: 2013).*
ADWEL, Wedge Tightness Detector Model WTD-501 Operating Manual (Year: 2001).*
Machine Translation JP 2000-131196 A (Year: 2020).*
I. Kimizuka, Current status and problem of sound quality evaluation in noise of information technology equipment, Society of noise control engineering, noise control, vol. 26, No. 1 , 2002, pp. 25-29 (with unedited computer-generated English translation).
I. Kimizuka et al., New proposal on sound quality evaluation parameter of pure tone component during noise from small fan, comprehensive symposium on environmental engineering lecture paper, 2016, vol. 26, session ID 128, p. 128, English abstract only.
Y Sonoda et al., A fundamental study on diagnostic mechanism of the rotary hammering test by acoustic analysis, Civil Engineering Society, Papers on Structural, Engineering, vol. 54A , Mar. 2008, 20 pages (with unedited computer-generated English translation).

\* cited by examiner

HAMMERING SOUND DIAGNOSTIC DEVICE AND METHOD USABLE WITH A ROBOT

CROSS-REFERENCE TO RELATED APPLICATION

This application is based upon and claims the benefit of priority from the prior Japanese Patent Application No. 2018-046871, filed on Mar. 14, 2018, the entire contents of which are incorporated herein by reference.

FIELD

Embodiments described herein relate generally to a diagnostic device, diagnostic robot, and diagnostic method.

BACKGROUND

Methods for diagnosing states of inspection targets on the basis of vibration and sound are broadly classified into the following two types of methods. One is a method of diagnosing an inspection target on the basis of vibration and sound excited at an abnormal portion of the inspection target according to exciting force applied from an excitation source such as a motor and a fan provided for the diagnostic device. The other is a method of diagnosing an inspection target on the basis of vibration and sound excited at an abnormal portion of the inspection target according to exciting force forcibly applied from the outside through an impact hammer and the like. Conventionally, in both diagnostic methods, states of inspection targets need to be diagnosed on the basis of diagnostic results of states of other inspection targets in order to diagnose the states of the inspection targets. For example, it is necessary to prepare diagnostic results with respect to normal portions and diagnostic results with respect to abnormal portions in advance and compare such preliminary diagnostic results with diagnostic results of an inspection target. Alternatively, it is necessary to diagnose states of specific inspection targets by analyzing a plurality of diagnostic results obtained by diagnosing other inspection targets.

However, there may be cases in which the state of an inspection target needs to be diagnosed by inspecting only the one inspection target, such as a case in which it is difficult to prepare diagnostic results of other inspection targets. Meanwhile, in hammering sound diagnosis performed by a person, there is a method of diagnosing the state of an inspection target by inspecting only the one inspection target. For example, in hammering sound diagnosis for inspecting wedge looseness, a person is able to determine whether wedge looseness has occurred by listening to the tone of the hammering sound generated at an inspected part. In this case, the tone is a high-pitched sound at a normal portion where a wedge is tightly fixed and the tone becomes a low-pitched sound at an abnormal portion where the wedge has become loose. This is because a low-pitched sound is generated when the air flowing into a gap due to loosening of the surrounding support of the wedge is discharged according to piston vibration and thus a low-pitched sound is further excited at the abnormal portion.

However, it is desirable to automatically perform hammering sound diagnosis using an inspection robot instead of hammering sound diagnosis performed by a person in order to achieve efficient diagnosis. In a hammering sound mechanism mounted in an inspection robot that is required to be small and light, in general, a low range may not be excited because there is no force to lift an entire abnormal portion where a wedge has become loose. Accordingly, when the state of an inspection target is diagnosed by inspecting only the one inspection target, there is a possibility of a normal portion and an abnormal portion being erroneously discriminated from each other through hammering sound diagnosis using a diagnostic robot.

DETAILED DESCRIPTION

According to one embodiment, a diagnostic device of an embodiment includes a hammering sound signal acquisition unit, a frequency characteristic conversion unit and an abnormality determination unit. The hammering sound signal acquisition unit acquires an i-th hammering sound signal representing a hammering sound with respect to striking applied to an i-th struck position among a plurality of struck positions of an inspection target, and a j-th hammering sound signal representing a hammering sound with respect to striking applied to a j-th struck position among the plurality of struck positions of the inspection target. The frequency characteristic conversion unit respectively converts the i-th hammering sound signal and the j-th hammering sound signal acquired by the hammering sound signal acquisition unit into an i-th frequency characteristic and a j-th frequency characteristic. The abnormality determination unit determines presence or absence of an abnormality in the inspection target on the basis of a matching degree of waveforms around peaks in the i-th frequency characteristic converted by the frequency characteristic conversion unit and waveforms around peaks in the j-th frequency characteristic converted by the frequency characteristic conversion unit.

Hereinafter, a diagnostic device, a diagnostic robot, and a diagnostic method according to embodiments will be described with reference to the drawings.

First Embodiment

A diagnostic robot according to a first embodiment is a robot for diagnosing loosening of a fixing member for fixing some members through hammering sound diagnosis, for example. Meanwhile, it is assumed that the fixing member is a wedge for fixing a stator coil of a turbine generator, as an example, in the following description.

Figure 1:
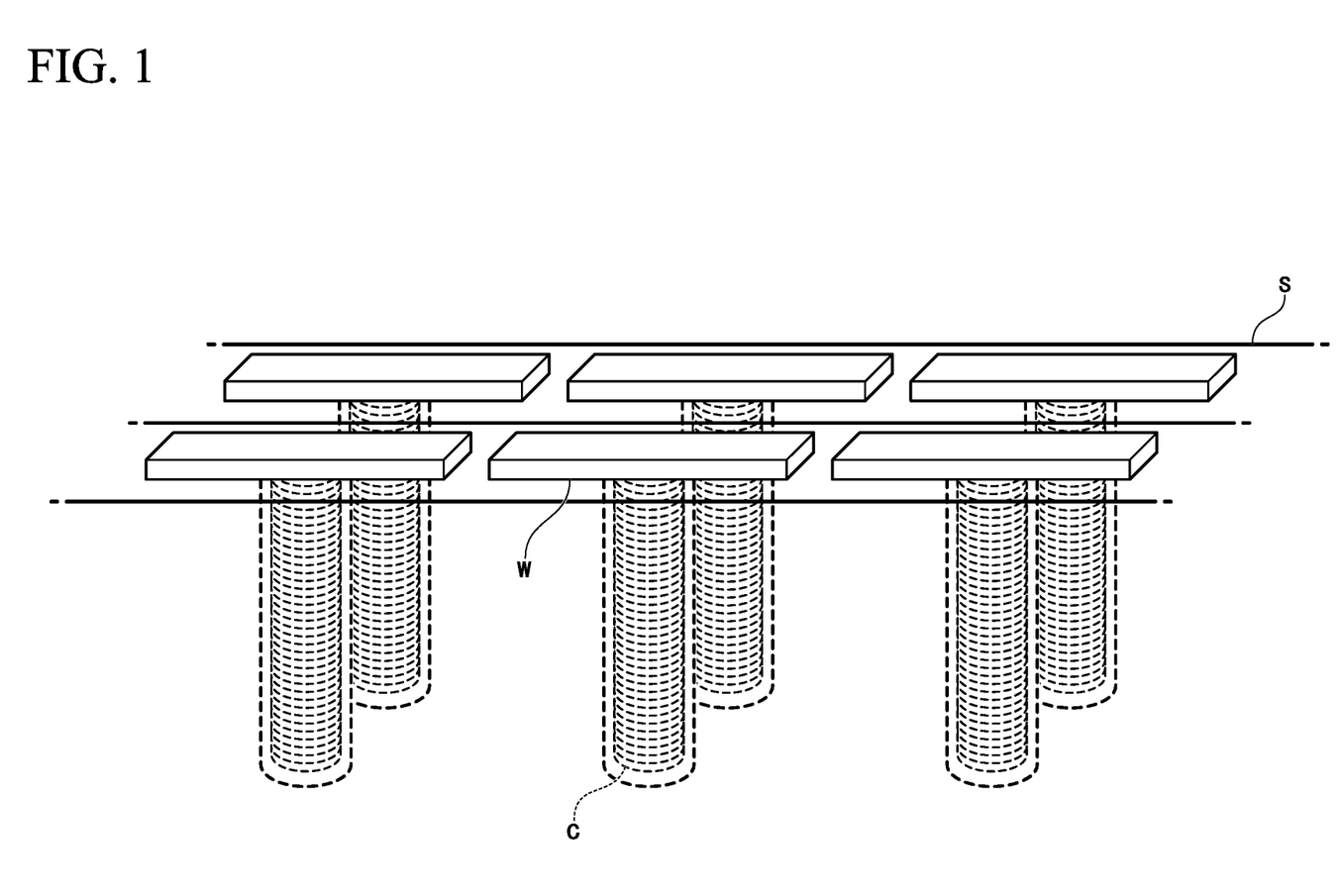
FIG. 1 is a schematic diagram showing wedges diagnosed through hammering sound diagnosis by means of a diagnostic robot according to a first embodiment.

FIG. 1 is a schematic diagram showing wedges w diagnosed through hammering sound diagnosis by means of the diagnostic robot 1 according to the first embodiment. As shown in FIG. 1, a plurality of wedges w for fixing stator coils c of a turbine generator are driven into a stator core s of the turbine generator in parallel.

Figure 2:
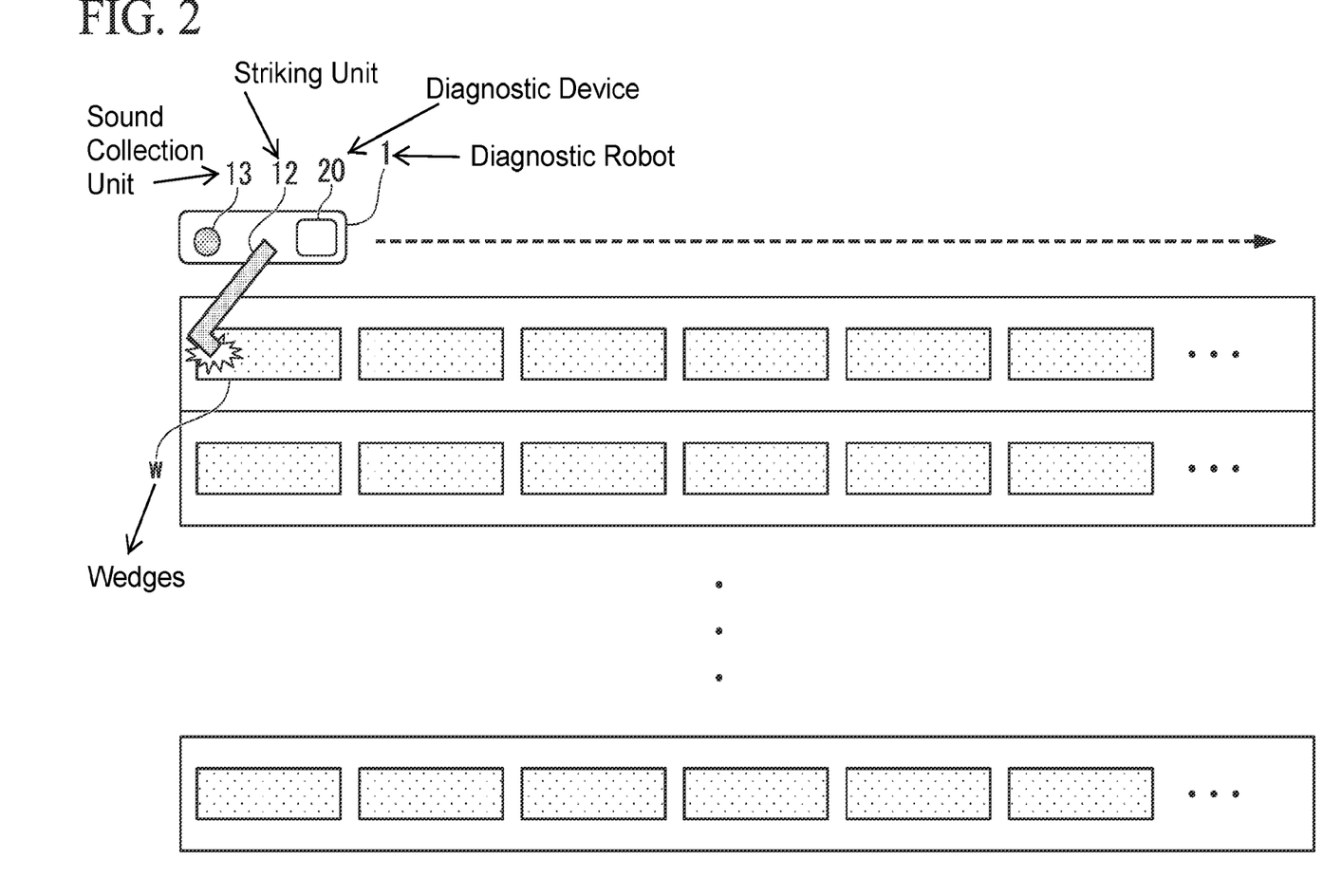
FIG. 2 is a schematic diagram showing hammering sound diagnosis by means of the diagnostic robot according to the first embodiment.

FIG. 2 is a schematic diagram showing hammering sound diagnosis by means of the diagnostic robot 1 according to the first embodiment. As shown in FIG. 2, the diagnostic robot 1 includes a striking unit 12, a sound collection unit 13 and a diagnostic device 20. Meanwhile, a detailed configuration of the diagnostic robot 1 will be described later.

The diagnostic robot 1 is able to move along the wedges w disposed in parallel. The diagnostic robot 1 sequentially strikes exposed surfaces of the wedges w disposed in parallel using the striking unit 12. The striking unit 12 includes a member (e.g., a hammer or the like) capable of generating a sound, which is generated when a fixing member is struck by the striking unit 12, in the fixing member. The diagnostic robot 1 collects sounds (hereinafter referred to as "hammering sounds") generated when the wedges w are struck by the striking unit 12 using the sound collection unit 13. The sound collection unit 13 includes a member (e.g., a sound collecting microphone) capable of collecting hammering sounds.

The diagnostic robot 1 sequentially strikes a plurality of struck positions instead of one struck position with respect to each wedge w while repeatedly shifting and collects hammering sounds generated by striking each struck position. That is, when there are 100 wedges w and 10 struck positions for one wedge w, for example, striking and sound collection are performed 1,000 times.

The diagnostic robot 1 analyzes striking signals representing hammering sounds generated by striking a plurality of struck positions of one wedge w and collected by the sound collection unit 13 using the diagnostic device 20. Accordingly, diagnostic robot 1 diagnoses states of the wedges w. Meanwhile, diagnosis mentioned here is determination of whether wedges w have not become loose (normal) or have become loose (abnormal).

In this manner, the diagnostic robot 1 according to the first embodiment diagnoses a state of one fixing member which is an inspection target only from inspection results with respect to the fixing member without using inspection results with respect to other fixing members. Accordingly, it is not necessary to consider diagnostic results with respect to other fixing members, and thus only a configuration with respect to hammering sound diagnosis for one wedge w will be described below.

Figure 3:
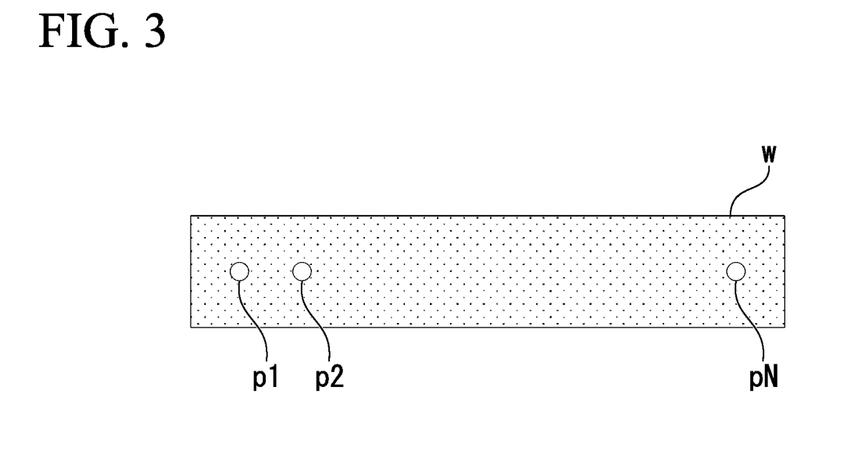
FIG. 3 is a schematic diagram showing a plurality of struck positions struck by the diagnostic robot according to the first embodiment.

FIG. 3 is a schematic diagram showing struck positions struck by the diagnostic robot 1 according to the first embodiment. As shown in FIG. 3, there are N struck positions struck by the diagnostic robot 1 in one wedge w. Here, N is any integer equal to or greater than 2. A struck position p1 represents a struck position initially struck in the wedge w. Similarly, struck positions p2 and pN respectively represent second and N-th struck positions in the wedge w.

Meanwhile, the diagnostic robot 1 repeatedly shifts to strike a plurality of struck positions, as described above. Accordingly, struck positions are arranged at equal intervals on a straight line in the shift direction of the diagnostic robot 1, as shown in FIG. 3, such that striking and sound collection are rapidly performed. However, arrangement of struck positions is not limited thereto and any arrangement is possible. In addition, the order of striking struck positions is not limited. Meanwhile, to further improve diagnosis accuracy, it is desirable to evenly set struck positions to cover the entire range of the wedge w.

Meanwhile, although the diagnostic robot 1 is configured to repeatedly shift to the vicinity of each struck position to strike the struck position in the first embodiment, the present invention is not limited to the aforementioned configuration as long as the diagnostic robot 1 has a configuration capable of striking each struck position. For example, the diagnostic robot 1 may be configured to include N striking units 12 corresponding to N struck positions and to strike the struck positions by means of the N striking units 12.

Meanwhile, the sound collection unit 13 may be installed at a different position from the striking unit 12 as long as the sound collection unit 13 has a configuration capable of collecting hammering sounds. In addition, the sound collection unit 13 may be configured to perform sound collection for all struck positions at one point without shifting. Further, the diagnostic device 20 may be installed at a different place from at least one of the striking unit 12 and the sound collection unit 13 as long as the diagnostic device 20 has a configuration capable of acquiring hammering sound signals representing hammering sounds collected by the sound collection unit 13.

Hereinafter, a functional configuration of the diagnostic robot 1 will be described.

Figure 4:
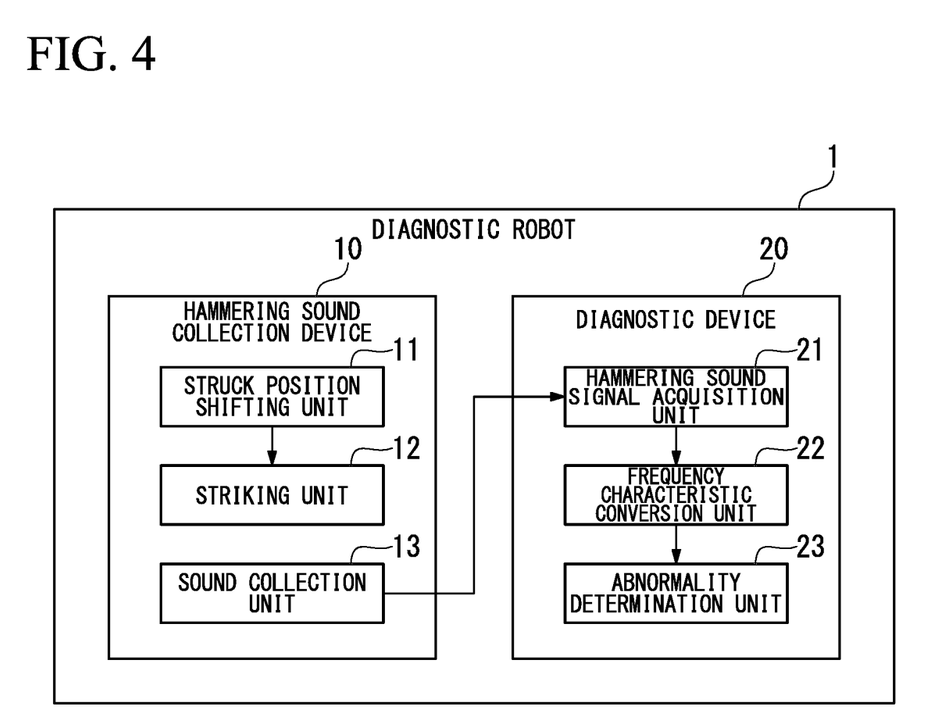
FIG. 4 is a block diagram showing a functional configuration of the diagnostic robot according to the first embodiment.

FIG. 4 is a block diagram showing the functional configuration of the diagnostic robot 1 according to the first embodiment. As shown in FIG. 4, the diagnostic robot 1 includes a hammering sound collection device 10 and the diagnostic device 20.

The hammering sound collection device 10 includes a struck position shifting unit 11, the striking unit 12 and the sound collection unit 13. The struck position shifting unit 1 shifts the diagnostic robot 1 such that the striking unit 12 is placed at a position where the striking unit 12 is able to strike a predetermined struck position. For example, the struck position shifting unit 11 includes an engine such as a motor. The striking unit 12 strikes a plurality of struck positions of a wedge w (inspection target) to generate hammering sounds. The striking unit 12 includes a member (e.g., a hammer or the like) capable of generating hammering sounds by striking the wedge w, as described above.

The sound collection unit 13 collects hammering sounds. As described above, the sound collection unit 13 includes a member (e.g., a sound collecting microphone) capable of collecting hammering sounds. The sound collection unit 13 outputs hammering sound signals representing collected hammering sounds to the diagnostic device 20.

Meanwhile, control for shifting the struck position shifting unit 11 to struck positions, control for causing the striking unit 12 to strike struck positions, and control for causing the sound collection unit 13 to collect hammering sounds are performed by a controller (not shown) included in the diagnostic robot 1. For example, the controller includes a processor such as a central processing unit (CPU). Further, the controller may be included in any one of the hammering sound collection device 10 and the diagnostic device 20 or included in both thereof.

The diagnostic device 20 includes a hammering sound signal acquisition unit 21, a frequency characteristic conversion unit 22 and an abnormality determination unit 23. The hammering sound signal acquisition unit 21 acquires a plurality of hammering sound signals representing hammering sounds generated by striking a plurality of struck positions of the wedge w from the sound collection unit 13. The hammering sound signal acquisition unit 21 outputs the acquired plurality of hammering sound signals to the frequency characteristic conversion unit 22.

The frequency characteristic conversion unit 22 acquires the plurality of hammering sound signals output from the hammering sound signal acquisition unit 21. The frequency characteristic conversion unit 22 converts the acquired plurality of hammering sound signals into frequency characteristics. The frequency characteristic conversion unit 22 outputs the converted plurality of frequency characteristics to the abnormality determination unit 23.

The abnormality determination unit 23 acquires the plurality of frequency characteristics output from the frequency characteristic conversion unit 22. The abnormality determination unit 23 determines whether loosening (abnormality) of the wedge w (inspection target) has occurred on the basis of a matching degree between waveforms around each peak in the acquired plurality of frequency characteristics.

Hereinafter, hammering sound diagnosis by means of the diagnostic device 20 will be described in more detail.

The frequency characteristic conversion unit 22 converts a hammering sound signal at a struck position pi (i=1 to N) into a frequency characteristic (i-th frequency characteristic). Meanwhile, the struck position pi indicates an i-th struck position in the wedge w. The abnormality determination unit 23 calculates a frequency envelope by performing linear predictive coding (LPC) analysis on the converted i-th frequency characteristic and identifies resonant frequencies of up to an M-th order Subsequently, the abnormality determination unit 23 performs prominence ratio (PR) analysis on each of the identified resonant frequencies of up to the M-th order to calculate each band width A including each of the identified resonant frequencies of up to the M-th order, each band width B of a region adjacent to the lower side of the band of each band width A, and each band width C of a region adjacent to the upper side of the band of each band width A.

In addition, the frequency characteristic conversion unit 22 converts a hammering sound signal at a struck position pj (i=1 to N) into a frequency characteristic (j-th frequency characteristic). Meanwhile, the struck position pj indicates a j-th struck position in the wedge w. The abnormality determination unit 23 calculates the energy of each band by performing integration on the converted j-th frequency characteristic in an integration range based on each band width A, each band width B and each band width C of up to the M-th order calculated as above.

The abnormality determination unit 23 calculates a band energy ratio PRdB (decibel) of the band width A with respect to the band energy obtained by adding the band energy of the band width B to the band energy of the band width C. The abnormality determination unit 23 calculates $PR_{i,j}dB$ which is the total sum of band energy ratios PRdB of up to the M-th order. $PR_{i,j}dB$ is a value indicating a degree to which waveforms represented by frequency characteristics obtained from hammering sounds generated by striking the struck position pj are within an integration range based on band widths calculated from resonant frequencies obtained from hammering sounds generated by striking the struck position pi. $PR_{i,j}dB$ is represented by the following equation (1).

$$PR_{i,j}dB = 10\log\left(\sum_{k=1}^{M} 10^{\frac{PRi,jdB(\omega k)}{10}}\right) dB \qquad (1)$$

Here, $PR_{i,j}dB(\omega k)$ is a dB value calculated according to PR analysis in a k-th-order resonant frequency ωk.

The abnormality determination unit 23 performs the aforementioned process on struck positions pi (i=1 to N) of N points and struck positions pj (j=1 to N) of N points to obtain N×N values of $PR_{i,j}dB$. The abnormality determination unit 23 determines whether loosening of the wedge w (abnormality) has occurred on the basis of the magnitude of the sum $Q_{ALL}$ of the N×N values of $PR_{i,j}dB$ (for example, on the basis of a result of comparison between the value of $Q_{ALL}$ and a predetermined threshold value). $Q_{ALL}$ is represented by the following equation (2).

$$Q_{ALL} = 10\log\left(\sum_{i=1}^{N}\sum_{j=1}^{N} 10^{\frac{PRi,jdB}{10}}\right) dB \qquad (2)$$

Hereinafter, data representing availability of resonant frequencies obtained by the aforementioned LPC analysis will be represented.

Figure 5:
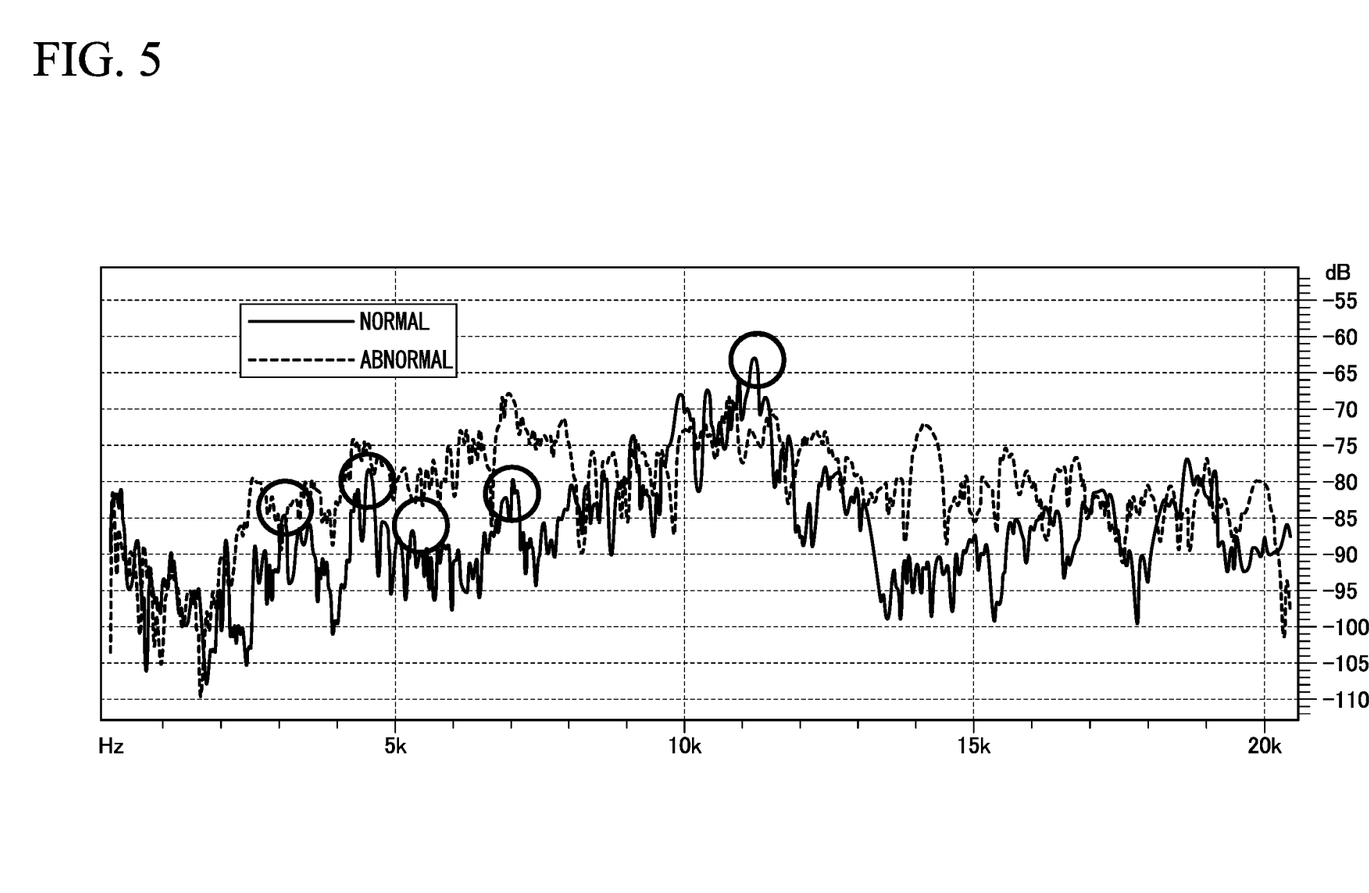
FIG. 5 is a diagram showing an example of resonant frequencies obtained using an actual wedge.

FIG. 5 is a diagram showing an example of resonant frequencies obtained from hammering sound diagnosis performed on actual wedges. The graph illustrated in FIG. 5 shows frequency characteristics obtained from a normal wedge and frequency characteristics obtained from an abnormal (loosened) wedge. In addition, a circle represents a frequency obtained by LPC analysis in hammering sound diagnosis performed on the normal wedge. It can be seen from the graph shown in FIG. 5 that frequencies obtained by LPC analysis almost match resonant frequencies (peaks of frequencies) obtained from the normal wedge.

Figure 6:
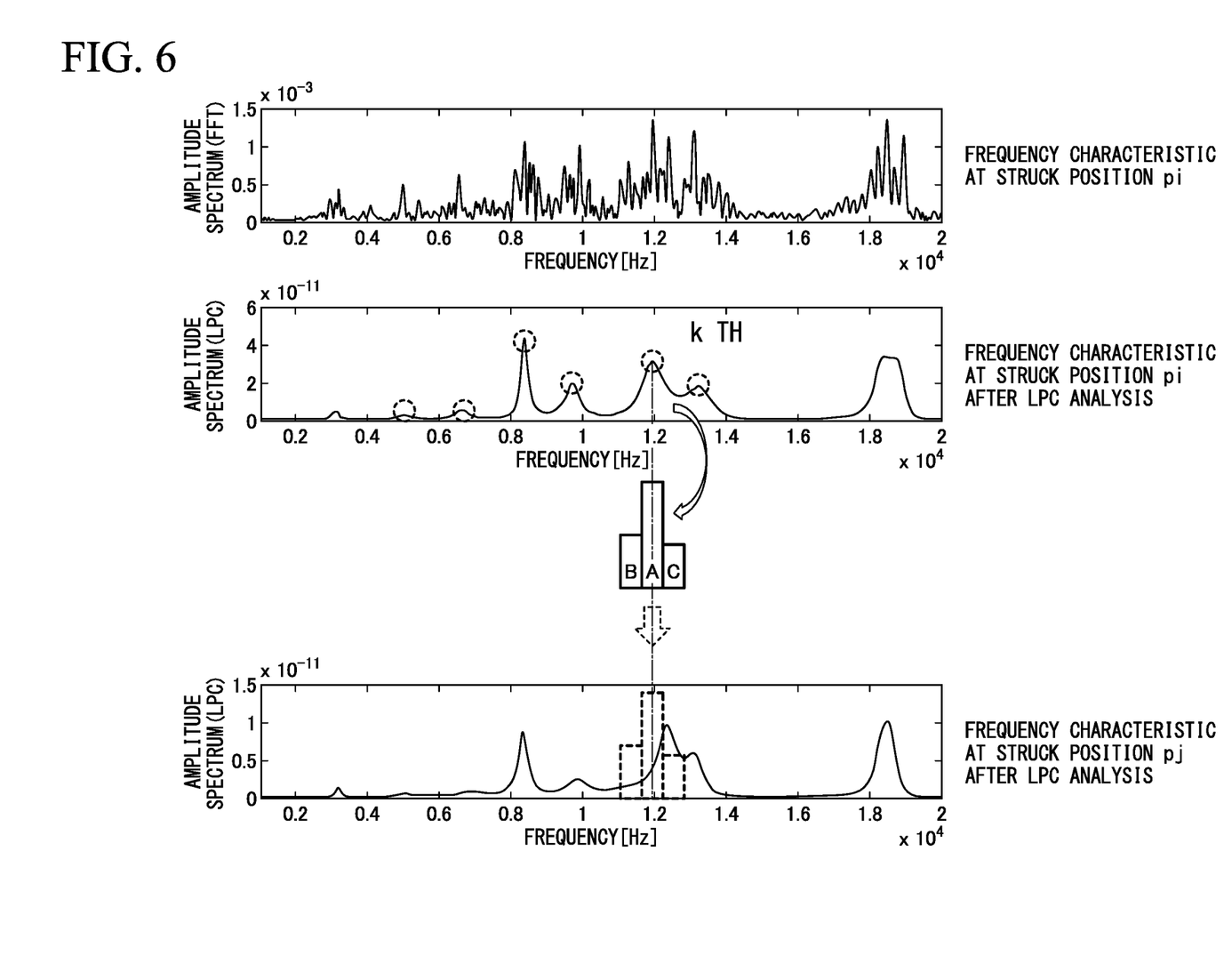
FIG. 6 is a diagram showing results of hammering sound diagnosis performed on an actual wedge.

FIG. 6 is a diagram showing results of hammering sound diagnosis performed on an actual wedge.

The upper graph of FIG. 6 shows a frequency characteristic converted from a hammering sound signal representing a hammering sound generated by striking the struck position pi. The middle graph of FIG. 6 shows a frequency characteristic after LPC analysis is performed on the frequency characteristic shown in the upper graph. In the middle graph of FIG. 6, resonant frequencies of up to the k-th order identified by LPC analysis are indicated by circles.

Meanwhile, resonant frequencies which are analysis targets may be determined on the basis of a predetermined threshold value. For example, only resonant frequency of equal to or lower than 1.5 kHz may become analysis targets. Accordingly frequency characteristic analysis becomes further easy.

In the frequency characteristic before LPC analysis is performed, shown in the upper graph of FIG. 6, a large number of peaks of the resonant frequency waveform are excited. On the other hand, in the frequency characteristic after LPC analysis is performed, shown in the middle graph of FIG. 6, resonant frequencies contributing to tones of hammering sound diagnosis are extracted.

PR analysis is performed on k-th-order (k=1 to M) resonant frequencies extracted through LPC analysis to calculate a band width A including the k-th-order resonant frequencies, and a band width B and a band width C of bands respectively adjacent to upper and lower sides of the band of the band width A.

Specifically, it is as follows. A noise component of a sharp peak (here, the extracted resonant frequency) in the frequency spectrum is regarded as a discrete tone. A prominence ratio (PR) is used as an index indicating a degree of sharpness of the peak according to this tone with respect to other frequency components around the peak. First, a critical band width $\Delta f_c$ having a frequency $f_0$ of a discrete tone which is an analysis target as the center is obtained from the following equation (3).

$$\Delta f_c = 25 + 75 \times [1.0 + 1.4 \times (f_0/1000)^2]^{0.69} \quad (3)$$

The critical band width $\Delta f_c$ corresponds to the aforementioned band width A. When the critical band width $\Delta f_c$ is calculated, the band width B of the band adjacent to the lower side and the band width C of the band adjacent to the upper side are also automatically determined through PR analysis.

The aforementioned prominence ratio (PR) is represented by $\Delta L_p$. $\Delta L_p$ is obtained by calculating a common logarithm of the ratio of the power $W_M$ of a signal included in a critical band having the frequency of a discrete tone as the center to the average of the powers ($W_L$ and $W_U$ respectively) of critical bands of lower and upper sides adjacent to the critical band, multiplying the common logarithm ten times and representing the resultant value in decibel. $\Delta L_p$ is represented by the following equation (4).

$$\Delta L_P = 10 \log_{10} \left( \frac{W_M}{(W_L + W_U)/2} \right) \text{ dB} \quad (4)$$

The lower graph of FIG. 6 shows a frequency characteristic (j-th frequency characteristic) after LPC analysis is performed on the frequency characteristic converted from the hammering sound signal representing the hammering sound generated by striking the struck position pj. The j-th frequency characteristic shown in the lower graph of FIG. 6 is integrated in an integration range based on the band width A, the band width B and the band width C including the k-th-order resonant frequencies, obtained according to the i-th frequency characteristic in the struck position pi, to calculate band energies.

$PR_{i,j}dB$ is obtained by summing band energies respectively calculated with respect to the k-th orders (k=1 to M). Further, the aforementioned process is performed on each of the struck positions pi (i=1 to N) of N points and the struck positions pj (j=1 to N) of N points to calculate N×N values of $PR_{i,j}dB$, as described above. Then, it is determined whether looseness (abnormality) has occurred in the wedge w on the basis of the magnitude of the sum $Q_{ALL}$ of the N×N values of $PR_{i,j}dB$ (e.g., on the basis of a result of comparison between sizes of the value of $Q_{ALL}$ and a predetermined threshold value).

Hereinafter, an example of the operation of the diagnostic robot 1 will be described.

Figure 7:
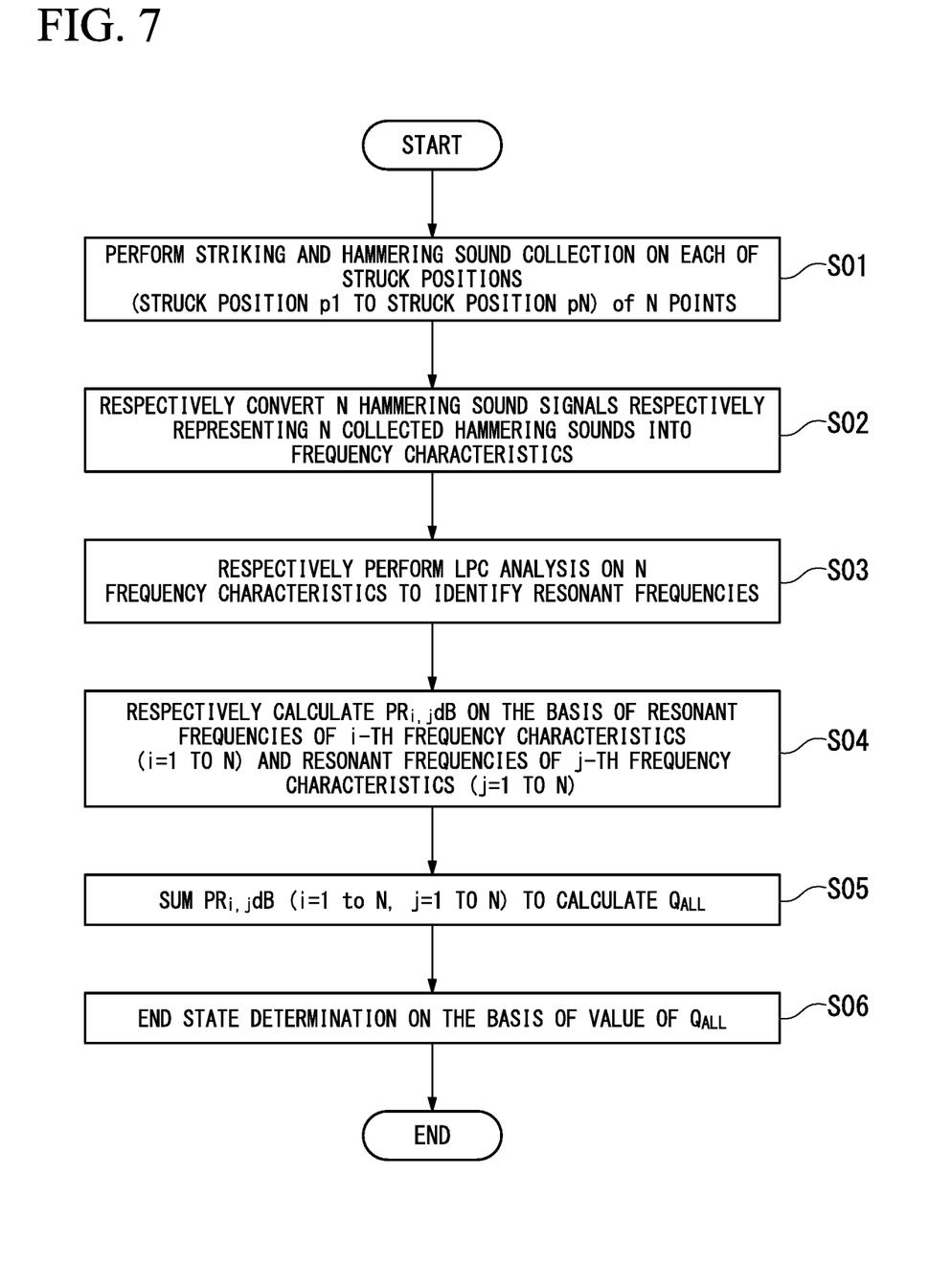
FIG. 7 is a flowchart showing an operation of the diagnostic robot according to the first embodiment.

FIG. 7 is a flowchart showing the operation of the diagnostic robot 1 according to the first embodiment.

The diagnostic robot 1 sequentially shifts to struck positions (struck position p1 to struck position pN) of N points of the wedge w according to the struck position shifting unit 11. The diagnostic robot 1 strikes each struck position through the striking unit 12. The diagnostic robot 1 collects hammering sounds generated according to striking of each struck position of the wedge w through the sound collection unit 13 (step S01).

The diagnostic robot 1 acquires N hammering sound signals respectively representing N hammering sounds collected by the sound collection unit 13 through the hammering sound signal acquisition unit 21. The diagnostic robot 1 converts the N hammering sound signals acquired by the hammering sound signal acquisition unit 21 into frequency characteristics through the frequency characteristic conversion unit 22 (step S02).

The diagnostic robot 1 performs LPC analysis on each of the N frequency characteristics converted by the frequency characteristic conversion unit 22 through the abnormality determination unit 23 to identify resonant frequencies (of up to the M-th order) of each frequency characteristic (step S03).

The diagnostic robot 1 calculates $PR_{i,j}dB$ on the basis of the identified resonant frequencies of the i-th frequency characteristic (i=1 to N) and the converted frequency characteristic which is the j-th frequency characteristic (j=1 to N) through the abnormality determination unit 23 (step S04).

The diagnostic robot 1 sums the calculated N×N number of $PR_{i,j}dB$ (i=1 to N and j=1 to N) through the abnormality determination unit 23 to calculate $Q_{ALL}$ (step S05).

The diagnostic robot 1 determines whether the wedge w is in a normal state or an abnormal state (whether looseness has occurred) on the basis of the calculated value of $Q_{ALL}$ (for example, on the basis of a result of comparison between the value of $Q_{ALL}$ and a predetermined threshold value) through the abnormality determination unit 23 (step S06).

In this manner, the process represented by the flowchart of FIG. 7 ends.

Figure 8:
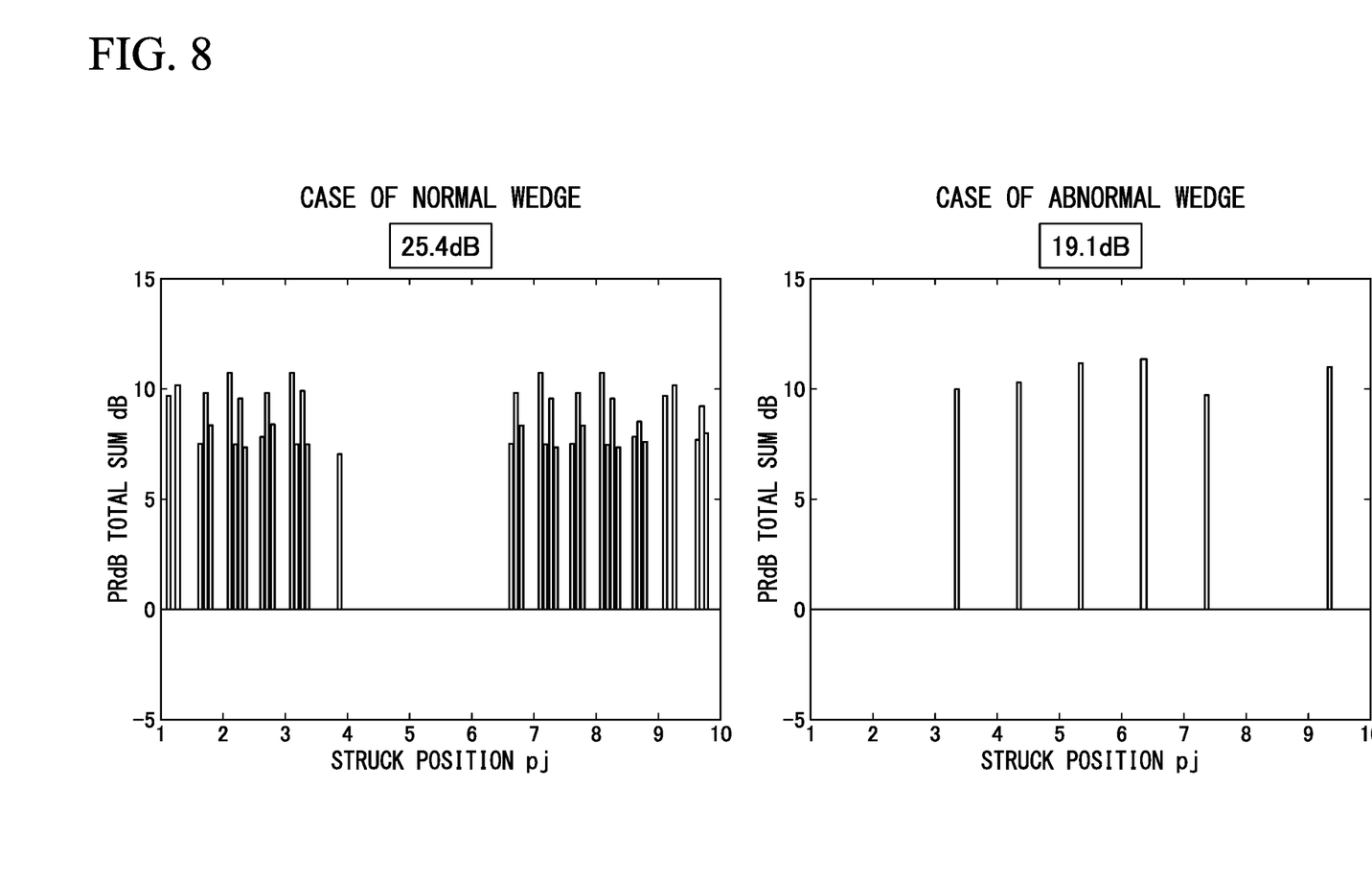
FIG. 8 is a diagram showing experimental results from hammering sound diagnosis according to the first embodiment.

Hereinafter, experimental results will be described. FIG. 8 is a diagram showing experimental results from hammering sound diagnosis according to the first embodiment. The graph on the left side of FIG. 8 shows an experimental result when hammering sound diagnosis has been performed on a normal wedge and the graph on the right side of FIG. 8 shows an experimental result when hammering sound diagnosis has been performed on an abnormal wedge.

In both graphs shown in FIG. 8, the vertical axis represents $PR_{i,j}dB$ which is a total sum of band energies of k-th order. Here, resonant frequencies of up to the fifth order (k=1 to 5) are targeted. In addition, the horizontal axis represents struck positions pj. Meanwhile, it is assumed that the number of struck positions is 10 in this experiment. Further, $PR_{i,j}dB$ with respect to each pi (i=1 to 10) is indicated for each struck position pj in order on the horizontal axis. That is, the bar graphs show values of $PR_{1,1}dB$, $PR_{2,1}dB$, ..., $PR_{10,1}dB$, $PR_{1,2}dB$, $PR_{2,2}dB$, ..., $PR_{10,2}dB$, ..., $PR_{1,10}dB$, $PR_{2,10}dB$, ..., $PR_{10,10}dB$ in order from the left.

In addition, two values indicated at the top of the graphs are total sums $Q_{ALL}$ of the 10×10=100 values of $PR_{i,j}dB$ in the case of the normal wedge and in the case of the abnormal wedge. As shown in FIG. 8, the value of $Q_{ALL}$ in the case of the normal wedge and the value of $Q_{ALL}$ in the case of the abnormal wedge are "25.4 dB" and "19.1 dB," respectively, according to experimental results. In this way, the value of $Q_{ALL}$ with respect to the normal wedge becomes larger than that with respect to the abnormal wedge even in the experimental results. Accordingly, it is possible to diagnose states of wedges by setting a threshold value which is a criterion for determination of a normal wedge and an abnormal wedge to values (e.g., 20 dB and the like) between 24.4 dB and 19.1 dB, for example.

Meanwhile, in the experimental results shown in FIG. 8, a threshold value was set for values which may become $PR_{i,j}dB$ and $PR_{i,j}dB$ was regarded as 0 dB when the value of $PR_{i,j}dB$ was less than the threshold value. That is, values of $PR_{i,j}dB$ less than the threshold values are not included in the value of $Q_{ALL}$. Further, the experimental results shown in FIG. 8 are experimental results when the threshold value was 7 dB.

Further, when the struck positions pj are struck position p4 and struck position p5, for example, the value of $PR_{i,j}$ dB is 0 dB even in the case of the normal wedge, as shown in FIG. 8. This is caused by variation in a degree of excitation of resonance due to striking manner and strength differences, generation of variations in natural resonant frequencies due to change of boundary conditions according to looseness of the wedge, and the like even in the case of the normal wedge.

However, in hammering sound diagnosis according to the first embodiment, frequency characteristics (j-th frequency characteristics) at a plurality of struck positions pj are analyzed for one wedge and each of the j-th frequency characteristics is compared with a plurality of comparison targets (i-th frequency characteristics), as described above. That is, struck positions pj (j=1 to N) which are inspection targets and struck positions pi (i=1 to N) which are comparison targets are analyzed in a round robin fashion. Accordingly, a wedge state is correctly diagnosed more easily even when there is variation in a degree of excitation of resonance and the like as described above.

Furthermore, the diagnostic robot 1 according to the first embodiment can automatically perform hammering sound diagnosis instead of hammering sound diagnosis by a person, as described above, and thus efficient diagnosis is achieved. In addition, the diagnostic robot 1 can also perform diagnosis with a hammering sound mechanism which has no power to lift an entire wedge and thus can be reduced in size and weight. Moreover, since the diagnostic robot 1 can inspect only one inspection target to diagnose the state of the inspection target, it is not necessary to prepare inspection results of other inspection targets.

Second Embodiment

Although a state of a wedge is determined on the basis of a matching degree of waveforms around peaks of resonant frequencies in the first embodiment, a state of a wedge may be determined on the basis of variations in resonant frequencies. Since support conditions are different for a normal wedge and an abnormal wedge, resonant frequencies also slightly change due to boundary condition differences. The diagnostic device may be configured to determine whether a wedge is in a normal state or an abnormal state on the basis of resonant frequency variations (frequency differences) obtained through LPC analysis. In this case, the diagnostic device calculates resonant frequency differences (e.g., standard deviations) between hammering sound generated by striking struck positions pi and hammering sound generated by striking struck positions pj to calculate a total sum of the frequency differences.

For example, frequency differences $\Delta f_{i,j}$ are represented by the following equation (5) and the total sum U of the frequency differences is represented by the following equation (6).

$$\Delta f_{i,j} = \sum_{k=1}^{M} (f_{i,k} - f_{j,k}) \text{ Hz} \quad (5)$$

$$U = \sum_{i=1}^{N} \sum_{j=1}^{N} \Delta f_{i,j} \quad f_i = \frac{\omega_i}{2\pi} \quad (6)$$

As described above, according to the second embodiment, it is possible to perform diagnosis on the basis of resonant frequency differences at a plurality of struck positions of one inspection target. Accordingly, it is possible to inspect only one inspection target to diagnose the state of the inspection target as in the first embodiment.

According to at least one of the above-described embodiments, it is possible to perform diagnosis without analyzing a plurality of diagnostic results obtained by diagnosing a plurality of inspection targets by adopting a configuration in which only one inspection target can be inspected to diagnose the state of the inspection target.

Meanwhile, the entire or part of diagnostic device 20 in the above-described embodiments may be realized by a computer. In such a case, a program for realizing the functions may be recorded in a computer-readable recording medium, and a computer system is caused to read and execute the program recorded in the recording medium.

Meanwhile, "computer system" mentioned here is a computer system embedded in the diagnostic device 20 and includes hardware such as an OS and peripheral devices. In addition, "computer readable recording medium" refers to portable media such as a flexible disc, a magneto-optical disc, a ROM and a CD-ROM and storage devices such as a hard disk embedded in computer systems.

Furthermore, "computer readable storage medium" may also include a medium which dynamically holds a program for a short time such as a communication line in a case in which the program is transmitted through a network such as the Internet or a communication line such as a telephone line, and a medium which holds a program for a specific time, such as a volatile memory in a computer system serving as a server or a client in that case. In addition, the aforementioned program may be a program for realizing some of the above-described functions and may be a program capable of realizing the aforementioned functions by combining the functions with a program recorded in a computer system.

Moreover, the entire or part of diagnostic device 20 in the above-described embodiments may be realized as an integrated circuit such as a large scale integration (LSI). Each functional block of the diagnostic device 20 may be individually realized as a processor, or some or all thereof may be integrated into a processor. Further, a method for realizing the integrated circuit is not limited to LSI, and the integrated circuit may be realized as a dedicated circuit or a general-purpose processor. In addition, when a circuit integration technology which replaces LSI appears with the development of semiconductor technology, an integrated circuit according to the technology may be used.

While several embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A diagnostic device comprising:
a hammering sound signal acquisition unit which acquires an i-th hammering sound signal representing a hammering sound with respect to striking applied to an i-th struck position among a plurality of struck positions of an inspection target, and a j-th hammering sound signal representing a hammering sound with respect to striking applied to a j-th struck position among the plurality of struck positions of the inspection target;
a frequency characteristic conversion unit which respectively converts the i-th hammering sound signal and the j-th hammering sound signal acquired by the hammering sound signal acquisition unit into an i-th frequency characteristic and a j-th frequency characteristic; and
an abnormality determination unit which determines presence or absence of an abnormality in the inspection target on the basis of a matching degree of waveforms around peaks in the i-th frequency characteristic converted by the frequency characteristic conversion unit and waveforms around peaks in the j-th frequency characteristic converted by the frequency characteristic conversion unit,
wherein the number of struck positions is N, and the abnormality determination unit calculates matching degrees of waveforms around peaks in the i-th frequency characteristics and waveforms around peaks in the j-th frequency characteristics with respect to each of combinations of N i-th frequency characteristics (i=1 to N) and N j-th frequency characteristics (j=1 to N), and determines presence or absence of an abnormality in the inspection target on the basis of a total sum of the calculated matching degrees.

2. The diagnostic device according to claim 1, wherein, when the calculated matching degrees are less than a predetermined threshold value, the abnormality determination unit does not include the matching degrees in the sum.

3. The diagnostic device according to claim 1, wherein the abnormality determination unit determines presence or absence of an abnormality in the inspection target on the basis of the matching degrees calculated through prominence ratio analysis.

4. The diagnostic device according to claim 1, wherein the abnormality determination unit determines presence or absence of an abnormality in the inspection target on the basis of matching degrees of waveforms around peaks in the i-th frequency characteristics equal to or less than 1.5 kHz and waveforms around peaks in the j-th frequency characteristics equal to or less than 1.5 kHz.

5. The diagnostic device according to claim 1, wherein the inspection target is a wedge which fixes a member and the abnormality is looseness of the wedge.

6. A diagnostic device comprising:
a hammering sound signal acquisition unit which acquires an i-th hammering sound signal representing a hammering sound with respect to striking applied to an i-th struck position among a plurality of struck positions of an inspection target, and a j-th hammering sound signal representing a hammering sound with respect to striking applied to a j-th struck position among the plurality of struck positions of the inspection target;
a frequency characteristic conversion unit which respectively converts the i-th hammering sound signal and the j-th hammering sound signal acquired by the hammering sound signal acquisition unit into an i-th frequency characteristic and a j-th frequency characteristic; and
an abnormality determination unit which determines presence or absence of an abnormality in the inspection target on the basis of a matching degree of waveforms around peaks in the i-th frequency characteristic converted by the frequency characteristic conversion unit and waveforms around peaks in the j-th frequency characteristic converted by the frequency characteristic conversion unit,
wherein the abnormality determination unit calculates matching degrees of waveforms of adjacent regions around peaks in the i-th frequency characteristics and waveforms of adjacent regions around peaks in the j-th frequency characteristics and determines presence or absence of an abnormality in the inspection target on the basis of a total sum of the calculated matching degrees.

7. The diagnostic device according to claim 6, wherein the abnormality determination unit determines presence or absence of an abnormality in the inspection target on the basis of the matching degrees calculated through prominence ratio analysis.

8. The diagnostic device according to claim 6, wherein the abnormality determination unit determines presence or absence of an abnormality in the inspection target on the basis of matching degrees of waveforms around peaks in the i-th frequency characteristics equal to or less than 1.5 kHz and waveforms around peaks in the j-th frequency characteristics equal to or less than 1.5 kHz.

9. The diagnostic device according to claim 6, wherein the inspection target is a wedge which fixes a member and the abnormality is looseness of the wedge.

10. A diagnostic robot comprising:
a striking unit which strikes each of a plurality of struck positions of an inspection target to generate a hammering sound;
a hammering sound signal acquisition unit which acquires an i-th hammering sound signal representing a hammering sound with respect to striking applied to an i-th struck position among the plurality of struck positions of the inspection target, and a j-th hammering sound signal representing a hammering sound with respect to striking applied to a j-th struck position among the plurality of struck positions of the inspection target;
a frequency characteristic conversion unit which respectively converts the i-th hammering sound signal and the j-th hammering sound signal acquired by the hammering sound signal acquisition unit into an i-th frequency characteristic and a j-th frequency characteristic; and
an abnormality determination unit which determines presence or absence of an abnormality in the inspection target on the basis of a matching degree of waveforms around peaks in the i-th frequency characteristic converted by the frequency characteristic conversion unit and waveforms around peaks in the j-th frequency characteristic converted by the frequency characteristic conversion unit,
wherein the number of struck positions is N, and the abnormality determination unit calculates matching degrees of waveforms around peaks in the i-th frequency characteristics and waveforms around peaks in the j-th frequency characteristics with respect to each of combinations of N i-th frequency characteristics (i=1 to N) and N j-th frequency characteristics (j=1 to N), and determines presence or absence of an abnormality in the inspection target on the basis of a total sum of the calculated matching degrees.

11. A diagnostic method comprising:

a hammering sound signal acquisition step of acquiring an i-th hammering sound signal representing a hammering sound with respect to striking applied to an i-th struck position among a plurality of struck positions of an inspection target, and a j-th hammering sound signal representing a hammering sound with respect to striking applied to a j-th struck position among the plurality of struck positions of the inspection target;

a frequency characteristic conversion step of respectively converting the i-th hammering sound signal and the j-th hammering sound signal acquired in the hammering sound signal acquisition step into an i-th frequency characteristic and a j-th frequency characteristic; and an abnormality determination step of determining presence or absence of an abnormality in the inspection target on the basis of a matching degree of waveforms around peaks in the i-th frequency characteristic converted in the frequency characteristic conversion step and waveforms around peaks in the j-th frequency characteristic converted in the frequency characteristic conversion step, wherein the number of struck positions is N, and the abnormality determination step calculates matching degrees of waveforms around peaks in the i-th frequency characteristics and waveforms around peaks in the j-th frequency characteristics with respect to each of combinations of N i-th frequency characteristics (i=1 to N) and N j-th frequency characteristics (j=1 to N), and determines presence or absence of an abnormality in the inspection target on the basis of a total sum of the calculated matching degrees.

\* \* \* \* \*